United States Patent
Lee et al.

(10) Patent No.: US 6,497,372 B2
(45) Date of Patent: Dec. 24, 2002

(54) AUTOMATIC TEMPERATURE CONTROL VALVE

(76) Inventors: Jae-Heung Lee, #404 Dongnam-Apt., Mansoo 5 dong, Namdong-Gu, Incheon-shi (KR); Yung-Kil Jun, 3-22 Cheongpa-Dong 1Ga, Yongsan-Gu, Seoul (KR); Jung-Hi Kim, 303 Cheongovilla, Daechi-Dong Gangnam-Gu, Seoul (KR)

( * ) Notice: Subject to any disclaimer, the term of this patent is extended or adjusted under 35 U.S.C. 154(b) by 0 days.

(21) Appl. No.: 09/813,273

(22) Filed: Mar. 19, 2001

(65) Prior Publication Data

US 2002/0069655 A1 Jun. 13, 2002

(30) Foreign Application Priority Data

Dec. 7, 2000 (KR) .............................................. 00-34346
Feb. 7, 2001 (KR) .............................................. 01-5899

(51) Int. Cl.⁷ .............................................. G05D 23/02
(52) U.S. Cl. .................................. 236/93 R; 236/101 D
(58) Field of Search .......................... 236/101 D, 93 R, 236/93 B

(56) References Cited

U.S. PATENT DOCUMENTS

| | | | | |
|---|---|---|---|---|
| 2,534,378 A | * | 12/1950 | Schlaich | 236/93 B |
| 4,210,284 A | * | 7/1980 | Tarnay et al. | 137/468 |
| 4,522,219 A | * | 6/1985 | Ohkata | 116/218 |
| 4,523,605 A | * | 6/1985 | Ohkata | 116/218 |
| 4,570,852 A | * | 2/1986 | Ohkata | 137/204 |
| 4,778,104 A | * | 10/1988 | Fisher | 137/468 |
| 4,932,429 A | * | 6/1990 | Watanabe et al. | 116/218 |
| 5,123,593 A | * | 6/1992 | Rundle | 236/101 D |
| 5,803,354 A | * | 9/1998 | Benedict | 236/101 D |
| 5,984,195 A | * | 11/1999 | Benedict | 236/12.2 |

* cited by examiner

*Primary Examiner*—William E. Tapolcai
(74) *Attorney, Agent, or Firm*—Sheridan Ross PC

(57) ABSTRACT

A valve body is provided with a valve chamber with a predetermined size having at both ends a fluid inlet and a fluid outlet, a coil spring mounted within the valve chamber of the valve body and expanding and contracting depending upon a variation of fluid temperature with respect to a predetermined value, and a needle inserted into the coil spring for opening and closing fluid passages by moving leftward and rightward within the valve chamber in response to the expansion and contraction of the coil spring.

7 Claims, 5 Drawing Sheets

AUTOMATIC TEMPERATURE CONTROL VALVE

FIELD OF THE INVENTION

The present invention relates to an automatic temperature control valve for automatically adjusting or controlling temperature of fluid passing through a valve body and, more particularly, to an automatic temperature control valve, wherein fluid or gas passing through a valve body is automatically adjusted or controlled using shape-memory alloy, thereby keeping the temperature of the fluid constant.

DESCRIPTION OF THE PRIOR ART

In general, a valve device controls the flow of fluid by using a valve stem and a handle adapted to depress a valve seat through which the fluid pass. Further, a temperature control device is employed to detect temperature of the fluid passing through the valve seat for a remote control of the fluid temperature.

As shown in FIG. 1, the prior art valve device for keeping the temperature of the fluid constant includes a fluid detecting sensor 103 mounted to a stem 102 of the valve 101 for detecting temperature of the fluid passing through a valve chamber, a transmission member 104 connected to the fluid detecting sensor 103 for transmitting signals therefrom, and a temperature control device 105 for opening and closing fluid passage depending upon the temperature signals from the transmission member 104 in order to keep the fluid at a constant temperature of a predetermined value.

Although the prior art valve device constructed in this manner works well during an initial period of time after an installation process, it experiences malfunction in controlling the temperature after a certain period of time, due to, e.g., aged components or external environmental factors. In addition, in the prior art valve device, the temperature control device is separated from the fluid detecting sensor by a long distance. Further, the prior art valve device is expensive and has a problem in that it's configuration gives a discomfort in a repair process. Furthermore, since the valve device is manually opened and closed by the handle, it is cumbersome to manipulate the handle.

SUMMARY OF THE INVENTION

It is, therefore, a primary object of the invention to provide an automatic temperature control valve wherein fluid passage of a valve body is automatically opened and closed to allow only fluid having a desired temperature to be flown by using shape-memory alloy within the valve body in order to keep the fluid at a constant temperature of a selected value.

In order to achieve the object, the present invention provides a valve body including therein a valve chamber with a predetermined size having at both ends a fluid inlet and a fluid outlet; an expansion and contraction means mounted within the valve chamber of the valve body and expanding and contracting depending upon a variation of fluid temperature with respect to a predetermined value; and a first opening and closing means inserted into the expansion and contraction means for opening and closing fluid passages by moving leftward and rightward within the valve chamber in response to the expansion and contraction of the expansion and contraction means.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

A preferred embodiment of the present invention is described with reference to accompanying drawings.

Figure 1:
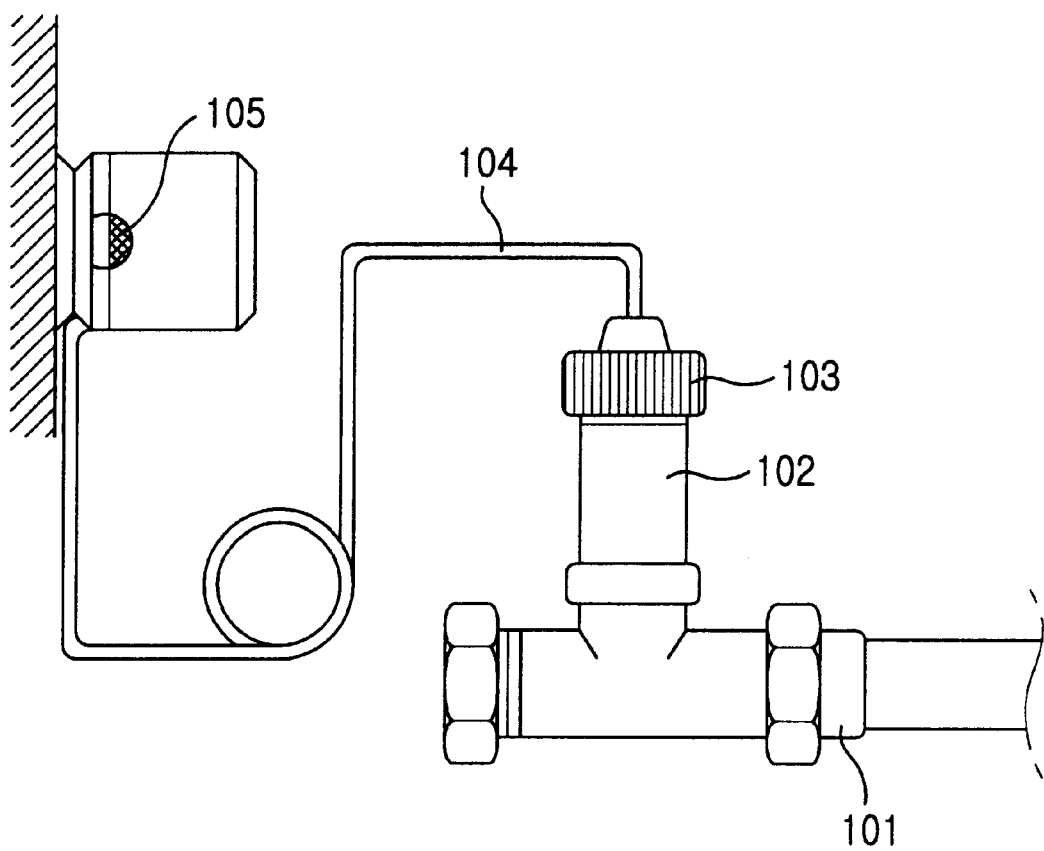
FIG. 1 illustrates a schematic view of a configuration of a prior art valve device.
Figure 2:
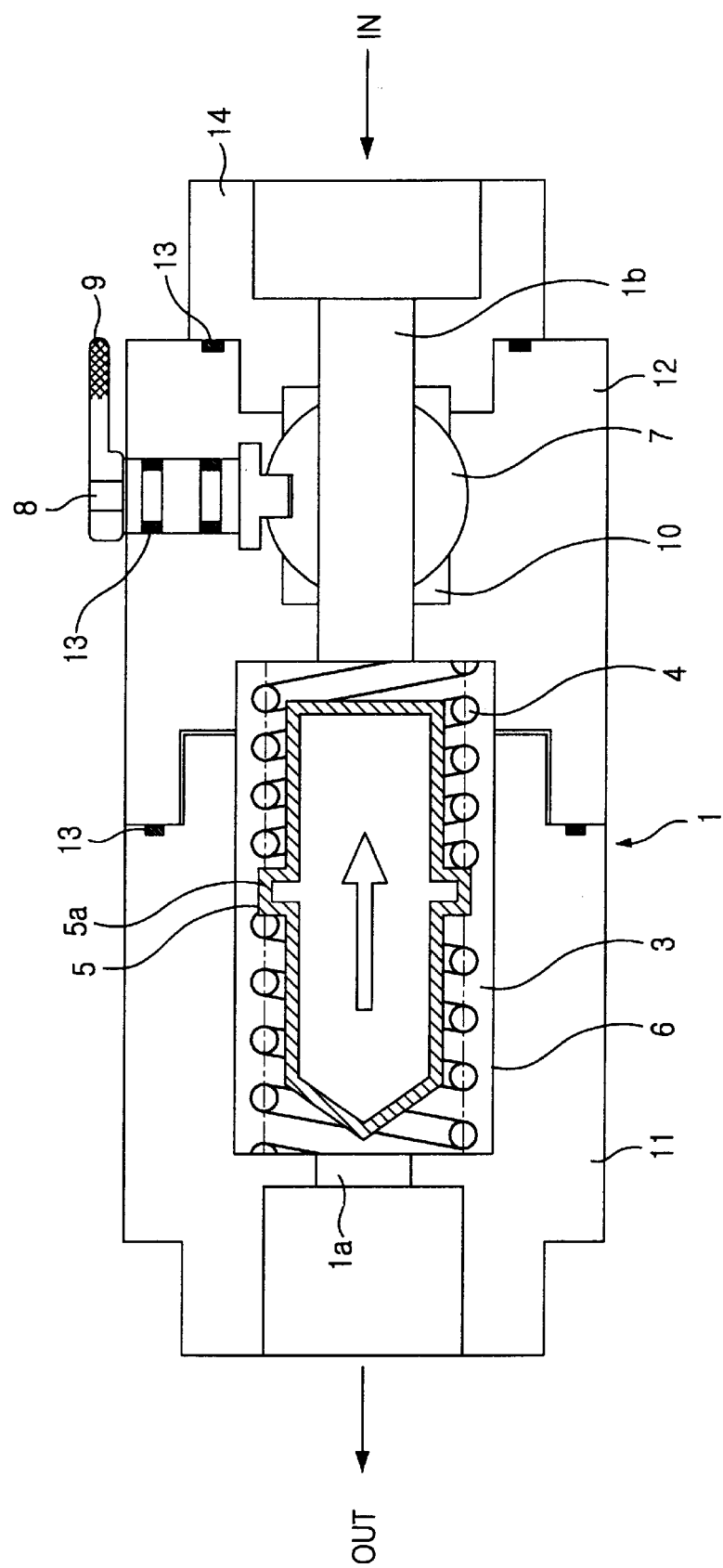
FIGS. 2 and 3 depict a configuration and an operational state of the inventive automatic temperature control device in accordance with one embodiment, respectively.
Figure 3:
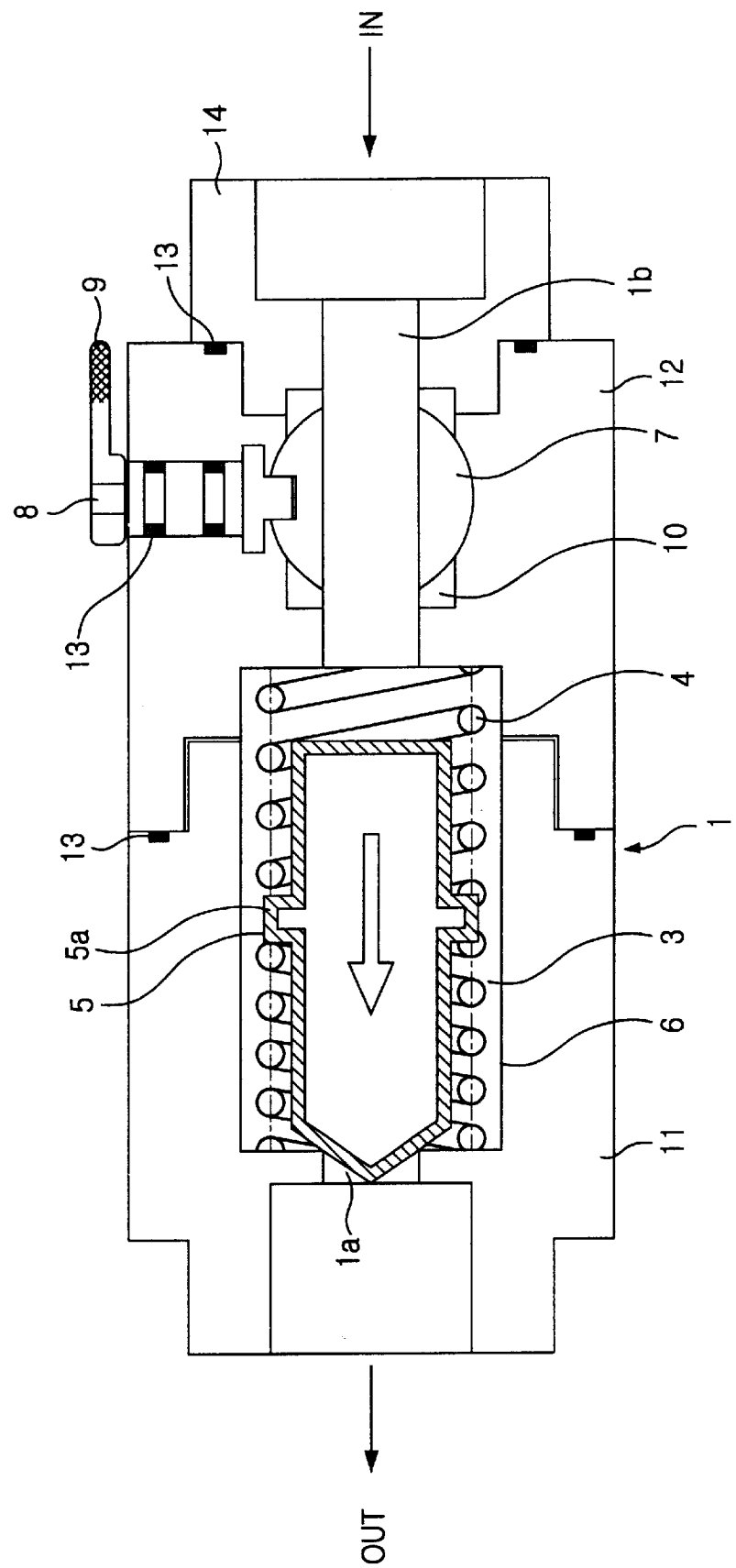

The inventive automatic temperature control valve configured to be automatically opened and closed depending upon temperature of fluid without a separate control device. As shown in FIGS. 2 and 3, as a preferred embodiment, the inventive automatic temperature control valve includes a valve body 1 provided with a valve chamber 1 having at its one side a fluid outlet 1a communicating with the valve chamber 1, and at its other side a fluid inlet 1b formed through the valve body 1 in a longitudinal direction to communicate with the valve chamber 3, a coil spring 4 mounted within the valve chamber 3 of the valve body 1 and made of shape-memory alloy for an expansion and contraction depending upon an increase and decrease of the temperature of the fluid with respect to a predetermined threshold value, a needle 5 whose one end is inserted into the coil spring 4, for opening and closing fluid passages in a manner to move rightward and leftward in response to the movements of the coil spring 4, i.e., the expansion and contraction, a bias spring 6 whose one end is positioned on an inner surface of the valve chamber 3, while the other end into which the other end of the needle 5 is inserted, the bias spring 6 for biasing the needle 5 in a direction to open the valve chamber 3, a ball 7 mounted in the fluid inlet 1b for opening and closing the fluid inlet 1b depending upon its rotation by a predetermined amount, a ball stem 8 whose one end is connected to the ball 7, while the other is exposed outside the valve body 1, a manual lever 9 connected to the ball stem 8 for providing the ball 7 with a rotational force, and a packing 10 provided around the ball 7 to seal the ball 7.

In this embodiment, the valve body 1 includes a first body 11 and a second body 12 which are assembled into the valve body, forming the valve chamber 3 and can be detached from each other. The needle 5 is pointed at its one end for blocking the fluid outlet 1a and has a protruding guide 5a protruding from an external surface thereof to be guided within the valve chamber 3.

The coil spring 4 serving as a key component in the present invention is made of shape-memory alloy for the expansion and the contraction depending upon the temperature. For example, in a case that the temperature of the fluid has to be maintained in 50 C, shape-memory alloy expanding at the temperature above 50 C and contracting at the temperature below 50 C is selected to manufacture the coil spring.

In order to provide an airtight environment between the first body 11 and the second body 12, an O-ring 13 is provided between the bodies 11 and 12. The O-ring 13 is also provided between the valve body 1 and a nut 14 mounted to an inlet passage of the second body 12.

The operation of the inventive automatic temperature control valve is described hereinbelow.

FIG. 2 shows a sectional view of the inventive valve in its opened state; and FIG. 3 represents a sectional view of the inventive valve in its closed state.

As shown in FIG. 2, when fluid having temperature lower than a predetermined value passes through the valve chamber 3 of the valve body 1, the coil spring 4 is contracted and the needle 5 is moved toward the fluid inlet to allow the fluid outlet 1a to be opened. At the moment, the bias spring 6 serves to depress the needle 5 toward the fluid inlet for a proper movement of the needle 5.

To the contrary, when fluid having temperature higher than the predetermined value passes through the valve chamber 3 of the valve body 1, the coil spring 4 expands and the needle 5 is moved toward the fluid outlet 1a against the depressing force by the bias spring 6 to allow the fluid outlet 1a to be closed.

As described above, the valve is operated in such a manner that the coil spring 4 expands and contracts depending upon the temperature of the fluid passing through the valve chamber 3 of the valve body 1 to automatically open and close the valve, thereby keeping the fluid at constant temperature.

Meanwhile, in order to manually block the fluid passages of the valve chamber 3, the manual lever 9 is pivoted from a opening position to a closing position by 90, so that the ball 7 permitting the fluid inlet 1b of the valve body 1 to be opened is rotated to close the fluid inlet 1b.

Another embodiment of the present invention will be described with reference to FIGS. 4 and 5.

As shown, the inventive valve is provided with a valve body 31 having in its inside a valve chamber 43, a coupler 32 whose one end is combined with the valve body 31, while the other is for a connection with an external pipe, and a ball valve 33 mounted to one side of the valve body 31.

The valve body 31 has at its one a fluid outlet 41a formed through the valve body 31, a first body 41 having a protuberance protruding from an inner periphery of the first body 41, and a second body 42 connected to the first body 41 and having a fluid passage 42a formed through the second body 42 in a longitudinal direction.

The first body 41 and the second body 42 form together the valve chamber 43 having a more expanded shape than the fluid outlet 41a and the fluid passage 42a. The first body 41 is connected to the second body 42 using a female thread formed on an inner periphery of the first body 41 and a thread connection of the second body 42 in which a male thread is formed on an outer periphery of the second body 42.

Further, the inventive valve is provided with a fist fixed ring 44 mounted to the first body 41 and the thread connection of the second body 42 and having a plurality fluid through holes 44a formed through the first fixed ring 44, a valve disk 45 coming into contact with the protuberance 41b protruding from the inner periphery of the valve chamber 43 of the first body 41 at its outer peripheral surface for opening and closing the fluid passage by moving rightward and leftward by an external force, a support 46 extending and passing through the first fixed ring 44 and the valve disk 45, thereby supporting the first fixed ring 44 and the valve disk 45, a second fixed ring 47 inserted and positioned around one end of the support 46, a coil spring 48 mounted between the one end of the valve disk 45 and the first fixed ring 44 for depressing the valve disk 45 toward the protuberance 41b, expanding and contracting depending upon the variation of the fluid temperature with respect to the predetermined threshold value, a bias spring 49 mounted between the other end of the valve disk 45 and the second fixed ring 47 for exerting a biasing force allowing the valve disk 45 to moved away from the protuberance 41b, and a connection nut 50 mounted to both ends of the support 46 to secure the first fixed ring 44 and the second fixed ring 47.

The coil spring 48 serving as a key component in this embodiment is made of shape-memory alloy for the expansion and the contraction depending upon the temperature. As the bias spring, conventional tension spring may be used.

On the other hand, the coupler 32 includes an union 61 engaged around one end of the valve body 31 in a thread engagement, and a nipple 62 whose one end is inserted into an inner surface of the union 61, while the other having a male thread for a connection for a separate pipe.

The ball valve 33 includes a body portion 71 engaged around an end of the second body 42 in a thread engagement and having a fluid inlet 71a communicating with the fluid passage formed through the body portion 71, a ball 72 mounted on the fluid passage of the body portion 71 for opening and closing the fluid passages by being rotated by a predetermined angle, a ball stem 73 whose one end is connected to the ball 72, while the other is exposed outside the body portion 71, a manual lever 74 connected to the ball stem 73 for providing the ball 72 with a rotational force, and a packing 75 provided around the ball 72 to seal the ball 72.

In this embodiment, O-rings 76 for providing an airtight environment are provided in a contact portion between the first body 41 and the second body 42, a contact portion between the second body 42 and the body portion 71, and a contact portion between the first body 41 and the nipple 62, respectively.

The operation of the second embodiment of the present invention constructed in this manner is described hereinbelow.

Figure 4:
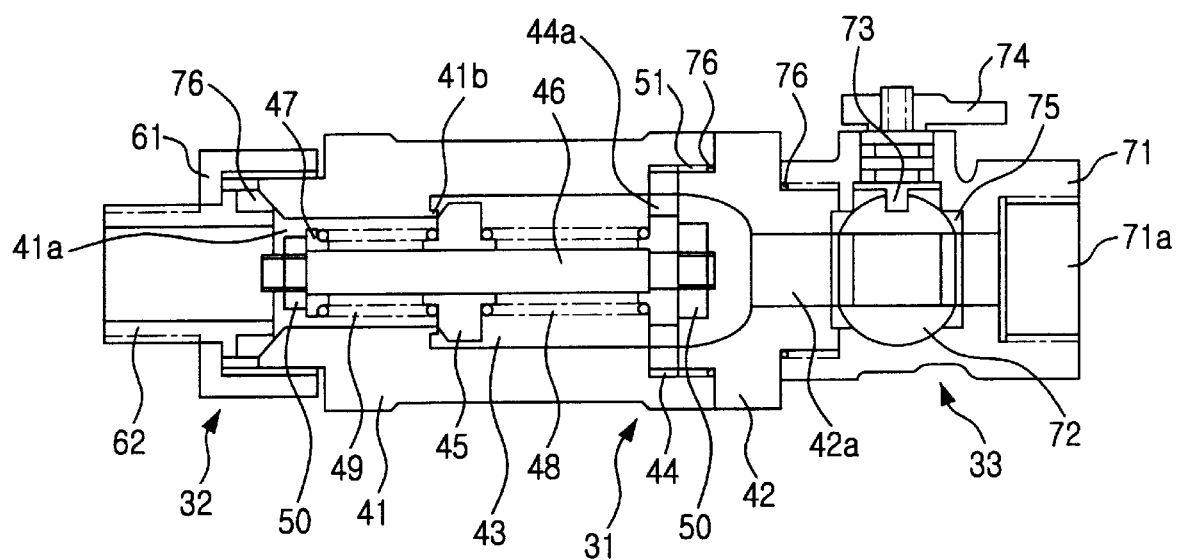
FIGS. 4 and 5 a configuration and an operational state of the inventive automatic temperature control device in accordance with another embodiment, respectively.
Figure 5:
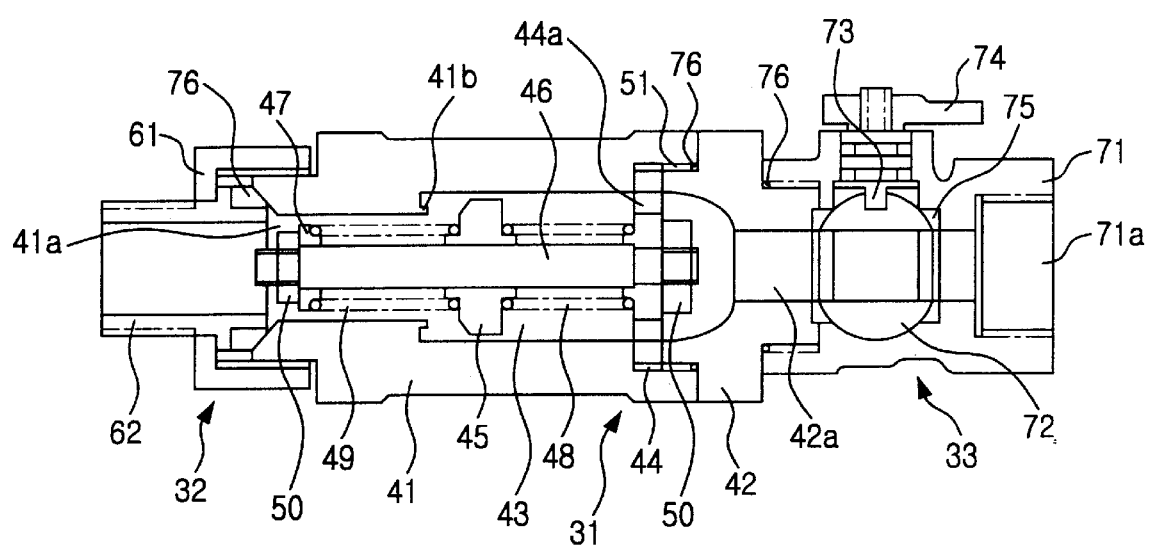

FIG. 4 gives a sectional view of the valve chamber in which the fluid outlet is closed by the valve disk; and FIG. 5 represents a sectional view of the valve chamber in which the fluid outlet is opened by the valve disk.

As shown in FIG. 4, when fluid having temperature lower than a predetermined value passes through the valve chamber 43, the coil spring 48 maintains its initial shape and the valve disk 45 is moved toward the fluid inlet by the depressing force by the bias spring 49 to allow the fluid outlet 41a of the valve chamber 43 to be opened.

To the contrary, when fluid having temperature higher than the predetermined value is introduced into the valve chamber 43 via the fluid through holes 44a of the first fixed ring 44, the coil spring 46 expands and the valve disk 45 is moved against the depressing force by the bias spring 49 to allow the fluid outlet 1a to be closed, blocking the flow of the fluid.

Meanwhile, in order to manually block the fluid passages of the valve chamber 43, the manual lever 74 is pivoted from an opening position to a closing position by 90, so that the ball 72 permitting the fluid inlet 71a of the body portion 71 to be opened is rotated to close the fluid passage.

By employing the inventive automatic temperature control valve, wherein the fluid passage is opened or closed depending upon the variation of the fluid temperature by using the coil spring made of the shape-memory alloy, a separate device for adjusting the temperature is not necessary. Further, controlling the flow rate and temperature of the fluid is performed with an increased reliability and with a reduced heat-loss, since only fluid having temperature of the predetermined value can be passed.

In addition, since the inventive valve has a simplified structure, it is easy to manufacture and has a reduced manufacturing cost. Furthermore, it has several advantages in that the valve body can be disassembled to simplify the repair process thereof and it has the manual lever for manually blocking the flow of the fluid in an emergency situation. The inventive valve is very economical since, with one valve, controlling the temperature as well as adjusting the flow rate is enabled.

Although the invention has been shown and described with respect to the preferred embodiments, it will be understood is by those skilled in the art that various changes and modifications may be made without departing from the spirit and scope of the invention as defined in the following claims.

What is claimed is:

1. An automatic temperature control valve comprising:
   (a) a valve body including therein a valve chamber with a predetermined size having at both ends a fluid inlet and a fluid outlet, wherein said valve body includes:
      (i) a first body having at its one side a fluid outlet formed through the first body in a longitudinal direction, and a protuberance protruding from an inner periphery thereof; and
      (ii) a second body assembled with the first body and having a fluid passage formed through the second body in a longitudinal direction, wherein the first body and the second body form together the valve chamber;
   (b) an expansion and contraction means mounted within the valve chamber of the valve body and expanding and contracting depending on a variation of fluid temperature with respect to a predetermined value; and
   (c) a first opening and closing means inserted into the expansion and contraction means for opening and closing fluid passages by moving in a first direction and in a second different direction within the valve chamber in response to the expansion and contraction of the expansion and contraction means, wherein said first opening and closing means includes:
      (i) a valve disk coming into contact with the protuberance protruding from the inner periphery of the valve chamber of the first body at its outer peripheral surface for opening and closing the fluid passage by moving in the second direction and in the first direction by an alien force; and
      (ii) a bias spring mounted between the other end of the valve disk and the second fixed ring for exerting a biasing force allowing the valve disk to moved away from the protuberance;
   (d) a fist fixed ring mounted to the first body and a thread connection of the second body, the first fixed ring supporting one side of the coil spring and having a plurality fluid through holes formed through the first fixed ring;
   (e) a support extending and passing through the first fixed ring and the valve disk, thereby supporting the first fixed ring and the valve disk; and
   (f) a second fixed ring inserted and positioned around one end of the support for supporting one side of the bias spring.

2. The automatic temperature control valve of claim 1, further comprising a second opening and closing means mounted to one side of the valve body for opening and closing the fluid passage of the valve body.

3. The automatic temperature control valve of claim 2, wherein said second opening and closing means includes:

a ball mounted in the fluid passage for opening and closing the fluid inlet passage depending upon its rotation by a predetermined amount;
   a packing provided around the ball to seal the ball; and
   a manual lever whose one end is connected to the ball, while the other end is exposed to the outside for providing the ball with a rotational force.

4. The automatic temperature control valve of claim 2, wherein said second opening and closing means includes:
   a body portion engaged around an end of the second body in a thread engagement and having a fluid inlet communicating with the fluid passage formed through the body portion;
   a ball mounted on the fluid passage of the body portion for opening and closing the fluid passages by being rotated by a predetermined angle;
   a manual lever whose one end is connected to the ball, while the other end is exposed to the outside of the body portion, for providing the ball with a rotation force; and
   a packing provided around the ball to seal the ball.

5. The automatic temperature control valve of claim 1, further comprising a coupler whose one side is connected to the valve body, while the other is for a connection with an external pipe.

6. An automatic temperature control valve comprising:
   (a) a valve body including therein a valve chamber with a predetermined size having at both ends a fluid inlet and a fluid outlet;
   (b) an expansion and contraction means mounted within the valve chamber of the valve body and expanding and contracting depending on a variation of fluid temperature with respect to a predetermined value;
   (c) a first opening and closing means inserted into the expansion and contraction means for opening and closing fluid passages by moving in a first direction and in a second different direction within the valve chamber in response to the expansion and contraction of the expansion and contraction means; and
   (d) a second opening and closing means mounted to one side of the valve body for opening and closing the fluid passage of the valve body, wherein said second opening and closing means includes:
      (i) a ball mounted in the fluid passage for opening and closing the fluid inlet passage depending upon its rotation by a predetermined amount;
      (ii) a packing provided around the ball to seal the ball; and
      (iii) a manual lever whose one end is connected to the ball, while the other end is exposed for providing the ball with a rotational force.

7. An automatic temperature control valve comprising:
   (a) a valve body including therein a valve chamber with a predetermined size having at both ends a fluid inlet and a fluid outlet, wherein said valve body includes:
      (i) a first body having at its one side a fluid outlet formed through the first body in a longitudinal direction, and a protuberance protruding from an inner periphery thereof; and
      (ii) a second body assembled with the first body and having a fluid passage formed through the second body in a longitudinal direction, wherein the first body and the second body form together the valve chamber;
   (b) an expansion and contraction means mounted within the valve chamber of the valve body and expanding and contracting depending on a variation of fluid temperature with respect to a predetermined value; and (c) a first opening and closing means inserted into the expansion and contraction means for opening and closing fluid passages by moving in a first direction and in a second different direction within the valve chamber in response to the expansion and contraction of the expansion and contraction means, wherein said second opening and closing means includes:

(i) a body portion engaged around an end of the second body in a thread engagement and having a fluid inlet communicating with the fluid passage formed through the body portion;

(ii) a ball mounted on the fluid passage of the body portion for opening and closing the fluid passages by being rotated by a predetermined angle;

(iii) a manual lever whose one end is connected to the ball, while the other end is exposed outside of the body portion, for providing the ball with a rotation force; and (iv) a packing provided around the ball to seal the ball.

* * * * *